United States Patent [19]

Grossman et al.

[11] Patent Number: 4,789,784
[45] Date of Patent: Dec. 6, 1988

[54] APPARATUS FOR ISOTOPIC ALTERATION OF MERCURY VAPOR

[75] Inventors: Mark W. Grossman, Belmont; William A. George, Gloucester; Rudolph V. Marcucci, Danvers, all of Mass.

[73] Assignee: GTE Products Corporation, Danvers, Mass.

[21] Appl. No.: 947,217

[22] Filed: Dec. 29, 1986

[51] Int. Cl.$^4$ ............................................. G01N 21/00
[52] U.S. Cl. ................................. 250/436; 250/505.1; 204/157.2; 422/186; 350/1.5
[58] Field of Search .................. 250/432 R, 436, 437, 250/423 P, 505.1; 422/186, 186.3; 204/157.2, 157.21, 157.22; 350/1.5, 312

[56] References Cited

U.S. PATENT DOCUMENTS 1,969,655 8/1934 Mailey ................................. 250/436
4,080,169 3/1978 Kloosterboer et al. ........ 250/432 R

FOREIGN PATENT DOCUMENTS 124144 2/1977 German Democratic Rep. .
837251 7/1978 U.S.S.R. ......................... 204/157.21

OTHER PUBLICATIONS

Grossman & Maya, "Photochemical Enrichment of $^{196}$Hg", 13th International Quantum Electronics Conference, (Jun. 1984).
Webster & Zare, "Photochemical Isotope Separation of $^{196}$Hg by Reaction with Hydrogen Halides", J. Phys. Chem., vol. 85, 1302(1981).
McDowell et al., "Photochemical Separation of Mercury Isotopes", Can. J. Chem., vol. 37, 1432, (1959).
A. C. G. Mitchell and M. W. Zemansky, Resonance Radiation and Excited Atoms, Chapter 4, "Collision Processes Involving Excited Atoms", (Macmillan, N.Y., 1934).
J. S. Deech, J. Pitre, and L. Krause, "Quenching and Depolarization of Mercury Resonance Radiation", Can. J. Phys., 49, 1976, (1971).
M. W. Zemansky, "Absorption and Collision Broadening of the Mercury Resonance Line", Phys. Rev., 36, 219, (1930).

*Primary Examiner*—Carolyn E. Fields
*Assistant Examiner*—John A. Miller
*Attorney, Agent, or Firm*—Martha Ann Finnegan

[57] ABSTRACT

An apparatus for enriching the isotopic Hg content of mercury is provided. The apparatus includes a reactor, a low pressure electric discharge lamp containing a fill including mercury and an inert gas. A filter is arranged concentrically around the lamp. In a preferred embodiment, constant mercury pressure is maintained in the filter by means of a water-cooled tube that depends from it, the tube having a drop of mercury disposed in it. The reactor is arranged around the filter, whereby radiation from said lamp passes through the filter and into said reactor. The lamp, the filter and the reactor are formed of a material which is transparent to ultraviolet light.

9 Claims, 2 Drawing Sheets

APPARATUS FOR ISOTOPIC ALTERATION OF MERCURY VAPOR

The Government has rights in this invention pursuant to subcontract 4524210 under Prime Contract DE-AC03-76SF00098 awarded by the United States Department of Energy.

TECHNICAL FIELD OF THE INVENTION

The present invention relates to equipment for use in a photochemical process and more particularly to equipment for use in a photochemical process for altering the isotopic composition of mercury.

BACKGROUND OF THE INVENTION

The excitation of specific mercury isotopes by photochemical means is well known in the art. For example, the paper by Webster and Zare, "Photochemical Isotope Separation of $^{196}Hg$ by Reaction with Hydrogen Halides" J. Phys. Chem. 85, 1302 (1981) discloses such excitation. Mercury vapor lamps are commonly used as an excitation source of mercury isotopes for specific photochemical reactions. To be successful, photochemical separation of a single isotope requires that the spectral band width of the exciting mercury radiation must be sufficiently narrow to excite only the isotope of interest. The specificity depends upon the spectral band width of the source. The rate and extent of separation of the particular isotope from the feed stock can be strongly dependent on the intensity of the radiation emitted from the mercury source.

A weakly ionized plasma of mercury and rare gases under low pressure, in the order of 1 to 3 torr, forms the basis of the fluorescent lamp. Electrical energy is converted to natural mercury resonance radiation at 253.7 nm. at an efficiency of 55 to 65%. This radiation, in fluorescent lamps, is converted to visible light by solid phosphors that are coated upon the lamp envelope. The efficiency of the 253.7 nm. resonance radiation emitted from excited mercury atoms in the plasma is absorbed and reemitted many times by ground state mercury atoms during its escape to the walls of the discharge tube. This trapping of resonance radiation prolongs the effective lifetime of the excited atoms and increases the opportunity for radiationless energy conversion which reduces efficiency.

It is known that the 253.7 nm. resonance line of mercury is composed of 5 hyperfine components, principally the result of isotope shifting. As is known, the $^{196}Hg$ isotope in natural mercury does not contribute substantially to the radiation because of its low concentration, nor does its emission and absorption heavily overlap with the other hyperfine components. Therefore, by increasing its concentration, an additional channel for the 253.7 nm. photons is provided which reduces the average imprisonment time and increases radiation efficiency.

Devices have previously been disclosed to enrich the $^{196}Hg$ in mercury feed stocks. In the paper of McDowell et al., "Photochemical Separation of Mercury Isotopes" Can. J. Chem. Vol. 37, 1432 (1959), a disclosure is made of reacting $^{202}Hg(6^3P_1)$ atoms that are contained in natural mercury with hydrogen chloride with a photochemical reaction in which the $^{202}Hg$ atoms are excited during the reaction to precipitate an $^{202}Hg_2Cl_2$.

As described in a paper delivered at the International Quantum Electronics Conference, June 1984, very high enrichment of $^{196}Hg$ can be achieved in a photochemical reaction using a natural mercury vapor filter. When radiation from a microwave lamp containing mercury enriched to 35% in $^{196}Hg$ is used in a filter, the filter eliminates substantially all of the $^{non-196}Hg$ component radiation permitting an isotopically selective primary excitation of the $^{196}Hg$ isotope. Selective excitation of $^{196}Hg(6^3P_1)$ in natural mercury vapor is obtained by an RF-excited, Hg and rare gas source whose emission is filtered through an atomic vapor filter before it enters into the reaction zone.

SUMMARY OF THE INVENTION

In accordance with the present invention there is provided an apparatus for enriching the isotopic content of mercury, the apparatus comprising; a low pressure electric discharge lamp, the lamp comprising an envelope transparent to ultraviolet light and a fill comprising mercury and an inert gas; a filter concentrically arranged around the low pressure electric discharge lamp, the filter being transparent to ultraviolet light; means for controlling mercury pressure in the filter; and a reactor arranged around the filter whereby radiation from the low pressure electric discharge lamp passes through the filter and into the reactor, the reactor being transparent to ultraviolet light.

In accordance with another aspect of the present invention there is provided a filter for photochemical isotope separation of $^{196}Hg$ from mercury, the filter comprising: a pair of concentrically arranged cylindrical members formed of a material transparent to 253.7 nm emissions; means for sealing the concentric cylinders from the atmosphere, and means for controlling mercury pressure within the filter.

BRIEF DESCRIPTION OF THE DRAWINGS

Figure 1:
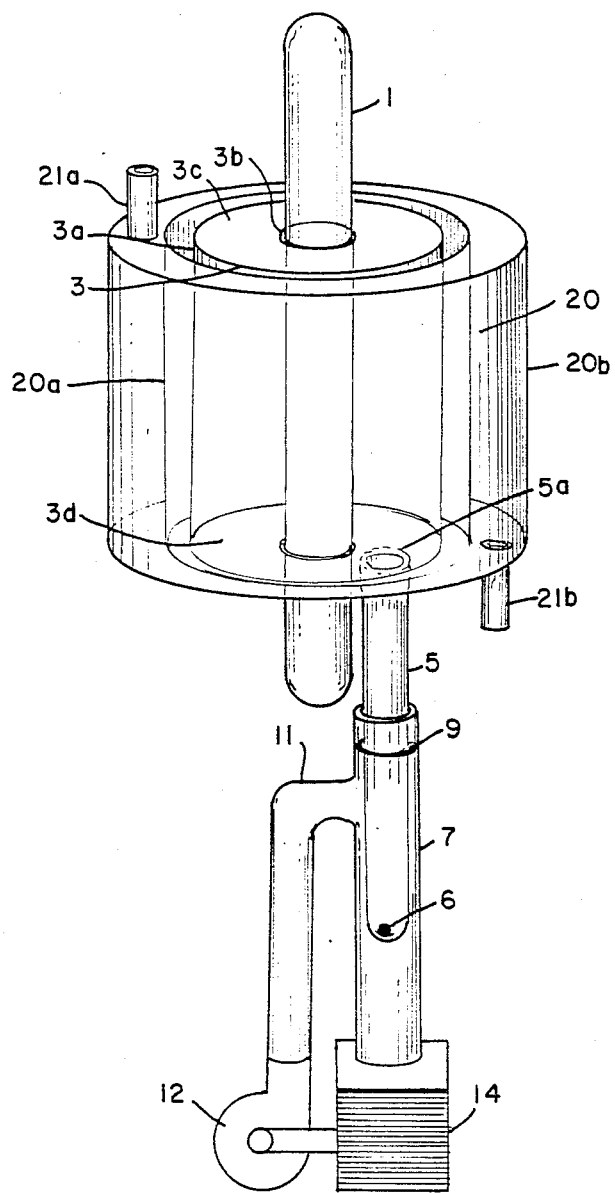

IN THE DRAWINGS:

FIG. 1 is a perspective view of an apparatus including a reactor vessel, filter means, and lamp according to a preferred embodiment of the present invention.

Figure 2A:
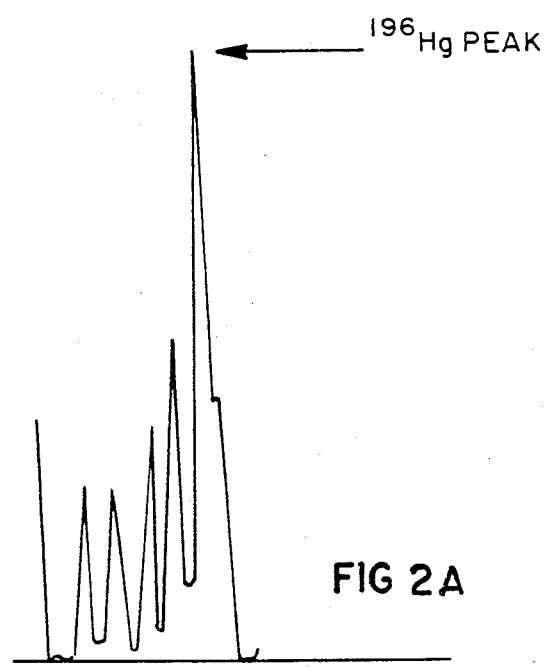
Figure 2B:
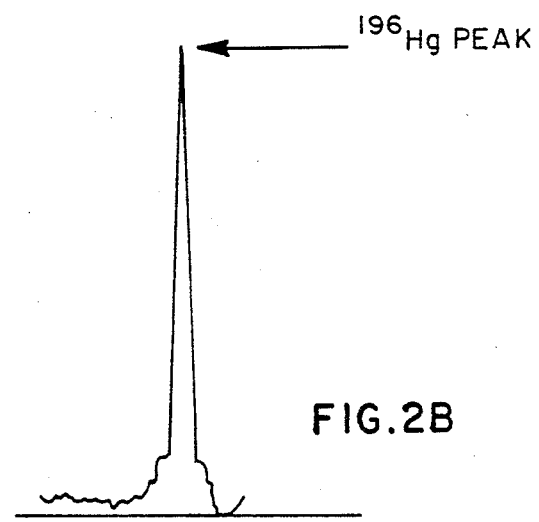

FIGS. 2A and 2B are curves illustrating the relevant portions of the spectral energy distribution curves of, respectively, the emission of a typical low pressure lamp and the emission after the light has passed through the filter of the present invention.

For a better understanding of the present invention, together with other and further objects, advantages and capabilities thereof, reference is made to the following disclosure and appended claims in connection with the above-described drawings.

DESCRIPTION OF THE PREFERRED EMBODIMENTS

The present invention is directed to an apparatus, or system, for enriching the $^{196}Hg$ content of mercury through a photochemical reaction between "natural" mercury, i.e., naturally occurring mercury, and hydrogen chloride. The system comprises a single pass reaction vessel which surrounds a filter, the filter in turn surrounds a low pressure electric discharge tube having a fill comprising mercury and an inert gas. All of the elements of the system, the lamp, the filter, and the reactor are formed of a glass which is transparent to radiation at 253.7 nm., such as, for example, quartz. Examples of low pressure (e.g., about 2.5 torr) electric discharge tube that are suitable for use with the system of the present invention include any of the known low pressure discharge lamps which transmit radiation in the range of 253.7 nm, especially those using microwave cavities for the excitation of the mercury.

A filter is disposed around the discharge tube and is formed of a pair of concentric cylindrical (or tubular) members that are sealed from the atmosphere at their ends. The filter contains a fill of mercury which is preferably depleted in $^{196}$Hg, and most preferably mercury including less than about 0.07 atomic weight percent) at a pressure of between about 6 to 24 millitorrs. Hydrogen is also included in the filter and is maintained at a pressure of between about 7 to 13 torrs. The concentric cylinders are preferably sealed at their ends with a pair of spaced-apart end members, so as to form a cylinder with an axially passageway that receives the low pressure discharge device. A means for controlling mercury pressure in the filter is in operational communication with the filter. One example of a mercury pressure controlling means includes a tube, sealed at one end and open to the interior of the filter at the other, which is disposed on the lower end member. A bead of mercury, having a weight of, for example, 10 to 20 milligrams, is disposed in the sealed end of the tube so that its vapors are in communication with the interior of the filter.

Optionally, the apparatus further includes a means for maintaining the mercury in the filter at a predetermined temperature. An example of such temperature maintaining means suitable for use with the foregoing example of a mercury vapor controlling means includes a heat exchanger disposed around the outside of the end of the tube and the bead of mercury so as to maintain the mercury at a predetermined temperature. Preferably, this heat exchanger is a sleeve with an inlet port and an outlet port, and having a pump and a temperature controller disposed on the line to control the temperature of the mercury bead, whereby to maintain a predetermined amount of mercury vapor in the filter.

A reactor is disposed about the filter and may take the form of a pair of concentric cylinders with an inlet and outlet port through which the mercury feed stock and hydrogen chloride can flow. The exciting $^{196}$Hg radiation passes through the lamp envelope and through the filter and into the reactor to produce an isotopic specific reaction to the $^{196}$Hg in the reaction vessel, whereby $^{196}$Hg$_2$Cl$_2$ is formed.

In a preferred embodiment, a "T" is disposed on the tube at a location between the filter and the end of the tube. The "T" can be used to make gross changes in the Hg pressure in the filter.

Referring to FIG. 1, there is shown a low pressure mercury lmap 1 comprising a silica or quartz discharge tube. A microwave cavity is placed over one end of the lamp in order to create the discharge. For isotope separation of $^{196}$Hg, the inner diameter of the tube in a preferred embodiment is approximately 5 mm. The discharge lamp 1 typically includes argon at a pressure of approximately 2.5 torr and a mercury pressure of approximately 1 to 1.5 millitorr at about 20° C. Although argon is preferred as an inert gas in the lamp, other gases such as neon may alternatively be used.

The filter 3 includes a pair of concentric cylindrical members 3a and 3b. In a preferred embodiment, the concentric cylindrical members are spaced from each other at a distance of about 1.0 centimeter. The filter 3 is sealed from the atmosphere by a seal means. In FIG. 1, the seal means comprises a pair of spaced apart end members 3c and 3d that are fused to the ends of the concentric cylindrical members 3a and 3b. An axial passageway is formed in the filter 3 by the inner cylindrical member 3b and is arranged to receive the lamp 1.

The apparatus of the present invention further includes a means for controlling mercury pressure within the filter. In the preferred embodiment shown, the means for controlling mercury pressure in the filter includes a tube 5, sealed at one end, and in communication with the interior of the filter 3 through port 5a is sealed to and projects from the lower end member 3d sealed to the concentric members 3a, 3b. A bead of mercury 6 is disposed at the closed end of the tube 5 and arranged so as to be in communication with the interior of the filter 3. Optionally, the means for controlling mercury pressure further comprises means for maintaining the mercury at a predetermined temperature. In the illustrated embodiment, the mercury temperature maintaining member comprises a sleeve 7 disposed about the end of the tube 5 and around the bead of the mercury 6. A sealing ring 9, such as a conventional O-ring, is disposed between the sleeve 7 and the tube 5 to hold the sleeve 7 in place and prevent leakage of heat exchange fluid (preferably water) which passes through the sleeve 7. The heat exchange fluid flows through a "T" connection 11, down sleeve 7 into heater 14 and thence to pump 12 to return to "T" 11. Pump 12 and heater 14 maintain the temperature of the tube at a predetermined level, so as to control the mercury vapor pressure in the filter. This control permits a predetermined quantity of mercury vapor to be maintained in the filter.

The reactor 20 is disposed around the filter 3 and includes a pair of spaced-apart concentric sleeves 20a and 20b. A conventional inlet and outlet port 21a and 21b are disposed on the top and bottom of the reactor 20 to allow for the passage of mercury feedstock.

The filter 3 is filled with a mixture of hydrogen or nitrogen gas (preferably hydrogen) and mercury vapor, having a reduced $^{196}$Hg content, as disclosed in co-pending application filed concurrently herewith, Ser. No. 247,216 and entitled Filter For Isotopic Alteration of Mercury Vapor, and assigned to the same assignee as the present application.

Turning to FIGS. 2A and 2B, it can be seen in FIG. 2A that the Hg($6^3$P$_1$–$6^1$S$_0$), viz, $^{196}$Hg, has many observable hyperfine emission peaks to the left of the principal peak. In FIG. 2B, the hyperfine emissions to the left of the principal emission peak are suppressed in the emissions which were measured after the radiation passed through the filter of the present invention, thereby improving the efficiency of the photochemical reaction process.

Without being limitative on the scope of the present invention, the following specific example is offered:

A low pressure mercury lamp was operated at 20° C. and the reactor was operated at 25° C. The filter was operated at 24° C. A flow of gases and vapors (at a total reactor pressure of 1 torr) formed of a mixture of 100 SCCM (standard cubic centimeters per minute) of butadiene and 100 SCCM HCl and mercury in the naturally-occurring state (having $^{196}$Hg of about 0.15 atomic weight percent) was passed through the reactor at a flow rate of 10 mg. of Hg per hour. After passing through the reactor and being irradiated with ultraviolet light from the filter, the $^{196}$Hg was enriched from about 0.15 atomic weight percent to about 4.0 atomic weight percent.

While there has been shown and described what are considered preferred embodiments of the present invention, it will be obvious to those skilled in the art that various changes and modifications may be made therein without departing from the invention as defined by the appended claims.

What is claimed is:

1. An apparatus for enriching the isotopic content of mercury, said apparatus comprising:
   a low pressure electric discharge lamp, said lamp comprising an envelope transparent to ultraviolet radiation and containing a fill comprising mercury and an inert gas;
   a filter concentrically arranged around said low pressure electric discharge lamp, said filter being transparent to ultraviolet radiation and containing mercury including $^{196}$Hg isotope;
   means for controlling mercury pressure in said filter; and
   a reactor arranged around said filter such that radiation passes from said low pressure electric discharge lamp through said filter and into said reactor, said reactor being transparent to ultraviolet light.

2. The apparatus according to claim 1 wherein the filter comprises a pair of concentrically disposed inner and outer cylindrical members joined together by a pair of spaced apart end members, said end members being fused to respective ends of the concentrically disposed cylindrical members.

3. The apparatus according to claim 1 wherein the means for controlling mercury pressure in said filter comprises a tube, said tube being sealed at one end and open to the filter at the other end, said tube containing a quantity of mercury disposed therein.

4. The apparatus according to claim 3 wherein said means for controlling mercury pressure in said filter further comprises means for maintaining the mercury at a predetermined temperature.

5. The apparatus according to claim 4 wherein the means to maintain the mercury at a predetermined temperature comprises a sleeve disposed over the sealed end of said tube and means to circulate a heat exchange fluid about said tube, and means to maintain said heat exchange fluid at a predetermined temperature.

6. A filter for photochemical isotope separation of $^{196}$Hg from mercury, said filter comprising:
   a pair of concentrically arranged cylindrical members formed of a material transparent to 253.7 nm. emissions;
   means for sealing the concentric cylinders from the atmosphere, and
   means for controlling mercury pressure in said filter.

7. The filter according to claim 6 wherein the means for controlling mercury pressure comprises:
   a tube sealed at one end and projecting from the filter, the interior of said tube being in communication with the interior of said filter; and
   a predetermined quantity of mercury disposed in said tube.

8. The filter according to claim 4 further including means to maintain said mercury at a predetermined temperature.

9. The filter according to claim 8 wherein the means to maintain the mercury at a predetermined temperature comprises a sleeve disposed about said tube and means to circulate a heat exchange fluid over said tube, at a predetermined temperature.

* * * * *